(12) United States Patent
Finkelstein et al.

(10) Patent No.: US 8,245,070 B2
(45) Date of Patent: Aug. 14, 2012

(54) METHOD FOR OPTIMIZING VOLTAGE-FREQUENCY SETUP IN MULTI-CORE PROCESSOR SYSTEMS

(75) Inventors: Lev Finkelstein, Netanya (IL); Yossi Abulafia, Kfar-Saba (IL); Aviad Cohen, Bat-Chen (IL); Ronny Ronen, Haifa (IL); Doron Rajwan, Rishon Le-Zion (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 12/317,845

(22) Filed: Dec. 30, 2008

(65) Prior Publication Data

US 2010/0169609 A1    Jul. 1, 2010

(51) Int. Cl.
*G06F 1/12* (2006.01)

(52) U.S. Cl. ............. 713/375; 713/322; 714/10; 714/30

(58) Field of Classification Search .................. 713/322, 713/375; 714/10, 30
See application file for complete search history.

(56) References Cited

U.S. PATENT DOCUMENTS

| | | | |
|---|---|---|---|
| 5,802,355 A * | 9/1998 | Arroyo et al. ................. | 713/375 |
| 6,026,231 A * | 2/2000 | Tymchenko ................. | 713/501 |
| 6,901,522 B2 * | 5/2005 | Buch ............................. | 713/320 |
| 7,925,901 B2 * | 4/2011 | Felter et al. ................... | 713/300 |
| 2010/0058086 A1 * | 3/2010 | Lee .............................. | 713/322 |

* cited by examiner

*Primary Examiner* — Thuan Du
(74) *Attorney, Agent, or Firm* — Winkle, PLLC

(57) ABSTRACT

A method for dynamically operating a multi-core processor system is provided. The method involves ascertaining currently active processor cores, identifying a currently active processor core having a lowest operating frequency, and adjusting at least one operational parameter according to voltage-frequency characteristics corresponding to the identified processor core to fulfill a predefined functional mode, e.g. power optimization mode, performance optimization mode and mixed mode.

15 Claims, 4 Drawing Sheets

METHOD FOR OPTIMIZING VOLTAGE-FREQUENCY SETUP IN MULTI-CORE PROCESSOR SYSTEMS

BACKGROUND

1. Technical Field

Embodiments of the invention relate generally to multi-core processors, and more particularly, to a method for optimizing the voltage-frequency parameters in multi-core processor systems.

2. Description of Related Art

Multi-core processor systems enable substantial performance increase without requiring a huge increase in processing speeds. Notably, multi-core processor systems enable parallel processing in computer programs.

While systems that use multi-core processors may work well for parallel computer programs, the degree of improvement of multi-core processor systems on legacy sequential computer programs is unclear. The main reason is the difficulties encountered in parallelizing computer programs using existing compiler technologies. One workaround approach is to keep the sequential computer programs unmodified and leverage on multiple processor-cores to speed up the computer programs transparently using only hardware mechanisms. This approach often relies on running the computer programs on two coupled processor-cores, where one processor-core is used to speed up the execution of the computer program on the other processor-core.

Even with this workaround approach, multi-core processors still suffer from a certain degree of performance loss as chip manufacturers typically specify conservative values for processor frequencies in order to guarantee accuracy of results during execution. In addition, the problem of within-die variation, which previously affects single core-based processors, is also observed to be manifesting on the per-processor-core level, thus affecting performance.

BRIEF DESCRIPTION OF THE DRAWINGS

Embodiments of the invention are disclosed hereinafter with reference to the drawings, in which.

DETAILED DESCRIPTION

Figure 1:
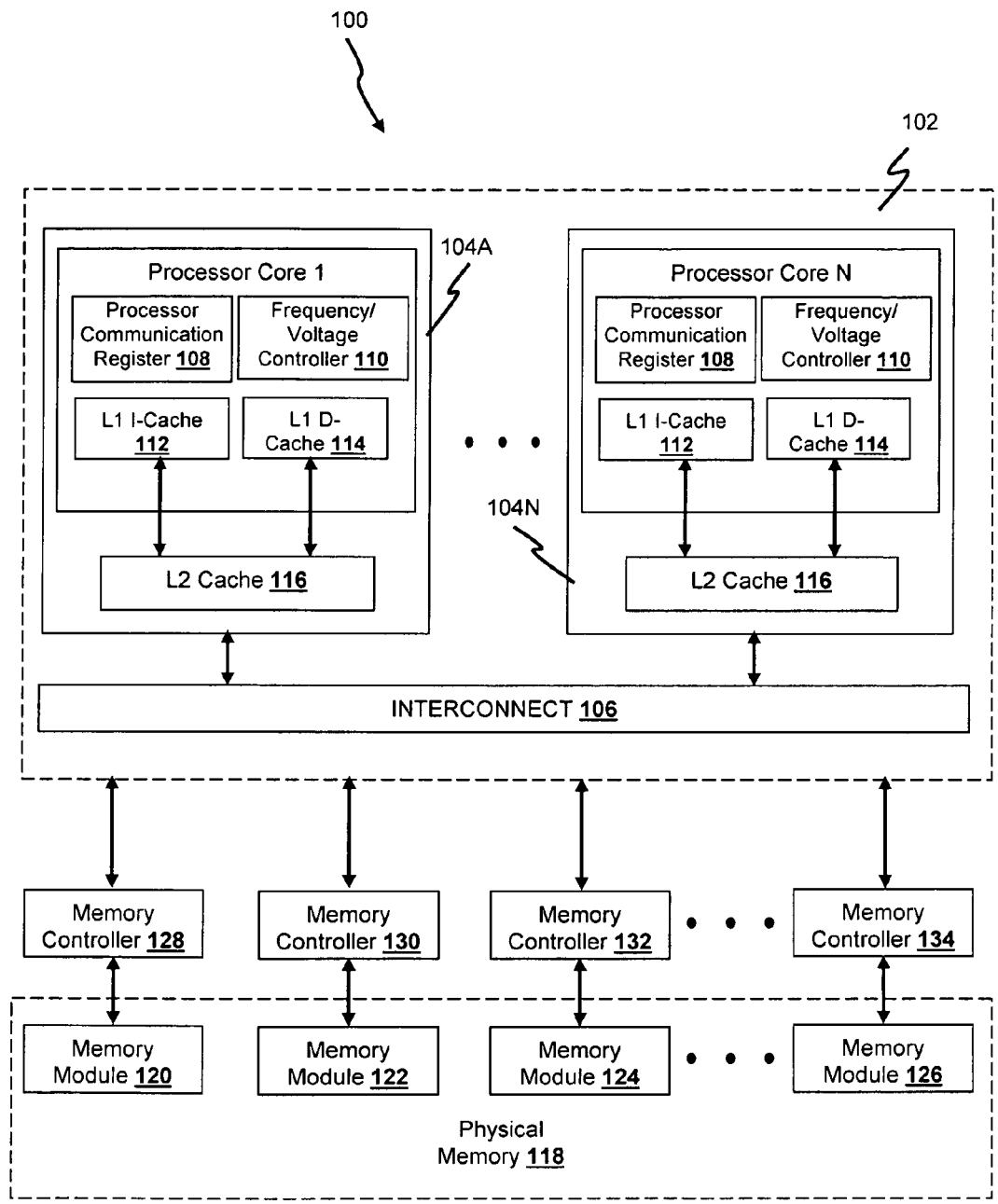
FIG. 1 illustrates a schematic block diagram of a multi-core processor system in accordance with an embodiment of the invention.

In the following description, numerous specific details are set forth in order to provide a thorough understanding of various illustrative embodiments of the present invention. It will be understood, however, to one skilled in the art, that embodiments of the present invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

It will also be understood that, although the terms first, second and etc. may be used herein to describe various elements, these elements should not be limited by these terms. These terms are only used to distinguish one element from another, without departing from the scope of the invention.

FIG. 1 illustrates a schematic block diagram of a data processing system 100 that uses a multi-core processor 102 in accordance with one embodiment of the invention. As illustrated, the multi-core processor 102 may include a plurality (e.g. 8) of processor cores 104A, . . . , 104N coupled in electrical communication to one another by an internal system interconnect 106 for communication. It is to be understood that embodiments of the invention are not limited to the number or type of processor cores. Each processor core 104A may be an integrated circuit comprising a processor communication register (PCR) 108, a frequency/voltage controller 110, associated level one (L1) instruction and data caches 112, 114 and an on-chip level two (L2) cache 116. Notably, the L1 and L2 caches 112, 114, 116 are collectively known as the cache subsystem. The L1 and L2 caches 112, 114, 116 may be operated at the full clock speed of the multi-core processor 102. Thus, the L1 and L2 caches 112, 114, 116 may be implemented using high-speed static random access memory (SRAM) devices.

The L1 instruction and data caches 112, 114 temporarily buffer instructions and operand data that are likely to be accessed by the associated processor core 104A. Further, as illustrated in FIG. 1, the memory hierarchy of the data processing system 100 also includes a physical memory 118 which comprises one or more memory modules 120, 122, 124, 126. The memory modules 120, 122, 124, 126 may be dynamic random access memory (DRAM) devices or static random access memory (SRAM) devices. The physical memory 118 forms the lowest level of volatile data storage in the memory hierarchy and, accordingly, one or more higher levels of cache memory (e.g. L2 cache 116) are utilized for storing and facilitating fast transfer of instructions and operand data from the physical memory 118 to the processor cores 104A, . . . , 104N. It is to be understood that each succeeding lower level of the memory hierarchy is typically capable of storing a larger amount of data than higher levels of the memory hierarchy, but at higher access latency. Moreover as shown in FIG. 1, the physical memory 118 is interfaced to a system interconnect 106 through memory controllers 128, 130, 132, 134 and may store operand data, operating systems and/or application programs. The memory controllers 128, 130, 132, 134 may control the corresponding memory modules 120, 122, 124, 126.

The system interconnect 106 is a high-speed internal data transfer bus, with substantially large bandwidth to enable exchange or synchronization of data between the processor cores 104A, . . . , 104N with low latency access. Accordingly, any possible occurrence of idle processor core cycles can be minimized. In addition, the system interconnect 106 may also be optimized to further improve the data transfer throughput performance between the processor cores 104A, . . . , 104N and the physical memory 118. Through improving the memory subsystem (i.e. improving efficiency and speed) and optimizing data access (i.e. minimizing latency), overall performance of the multi-core processor 102 as a unit may be improved by ensuring data can be shared and processed as fast as possible among all the processor cores 104A, . . . , 104N.

The frequency/voltage controller 110 that resides within each of the processor cores 104A, . . . , 104N may be used to trigger a voltage/frequency adjustment if required. Each processor core 104A may control its own voltage and frequency operating points through the frequency/voltage controller 110. In addition, the frequency/voltage controller 110 may measure the electrical current consumption of the processor core 104A or the temperature of the multi-core processor 102. Optionally, the frequency/voltage controller 110 may also receive inputs from sensors external to the multi-core processor 102. Alternate embodiments of a frequency/voltage controller 110 mechanism may also be used in microcontrollers, embedded processors, graphics devices, digital signal processors (DSPs) or other types of logic circuits.

In accordance with one embodiment of the invention, each of the processor cores 104A, . . . , 104N is provided with the processor communication register (PCR) 108 therein. Each PCR 108 stores identical information that is useful to the multi-core processor 102 in the data processing system 100, such as processor communication information used to coordinate pipelined or parallel multi-processing. Each PCR 108 may be an N-bytes register that can be read by an associated processor core 104A. Alternatively, each of the N-bytes may be exclusively allocated for storing data by the respective associated processor cores 104A, . . . , 104N. During operation, each of the processor cores 104A, . . . , 104N maintains access to the contents of its own PCR 108 and is able to perform write-through to an exclusive allocated sector within its own PCR 108 and the PCRs 108 of the other processor cores 104A, . . . , 104N. Analogously, each of the processor cores 104A, . . . , 104N within the multi-core processor 102 writes to the PCR 108 in each of the processor cores 104A, . . . , 104N, but only to its pre-designated byte sector of N-bytes register in the PCR 108. In such a manner, coherency of the PCR data may then be maintained. Notably, the speed and bandwidth of the system interconnect 106 are functionally important in helping to achieve data coherency.

During operation of the multi-core processor 102, each PCR 108 is continually being updated by an associated processor core 104A which also simultaneously updates its exclusive allocated byte-sector within the other PCRs 108. Consequently, all the processor cores 104A, . . . , 104N are then updated on any changes in the PCR data. For example, in an embodiment, a first processor core 104A would effect a change to its byte-sector of all the PCRs 108 by amending the data contained within its own PCR 108 and thereafter transmitting a write-through command over the system interconnect 106 directed to the PCRs 108 in the rest of the processor cores 104B, . . . , 104N. Notably, the cache subsystem 112, 114, 116 is bypassed during this process. The write-through command of the first processor core 104A may address the byte-sector allocated to it, which is the first byte within the N-bytes of each PCR 108. A second processor core 104B, for example, may then send a write-through command to the other processor cores 104A, 104C, . . . , 104N that is specifically addressed to the second byte within the N-bytes of each PCR 108. It is however to be appreciated that the PCRs 108 are not limited to any specific size capacity or to any particular number of register bytes to be allocated to a specific processor core. In alternative embodiments, the PCRs 108 may hold any number of bytes or allocate any number of register bytes to a particular processor core. In addition, the processor cores 104A, . . . , 104N may also use other alternative write-modes (e.g. write-back or write-through-with-buffer) known in the art for writing data to the PCRs 108.

Figure 2:
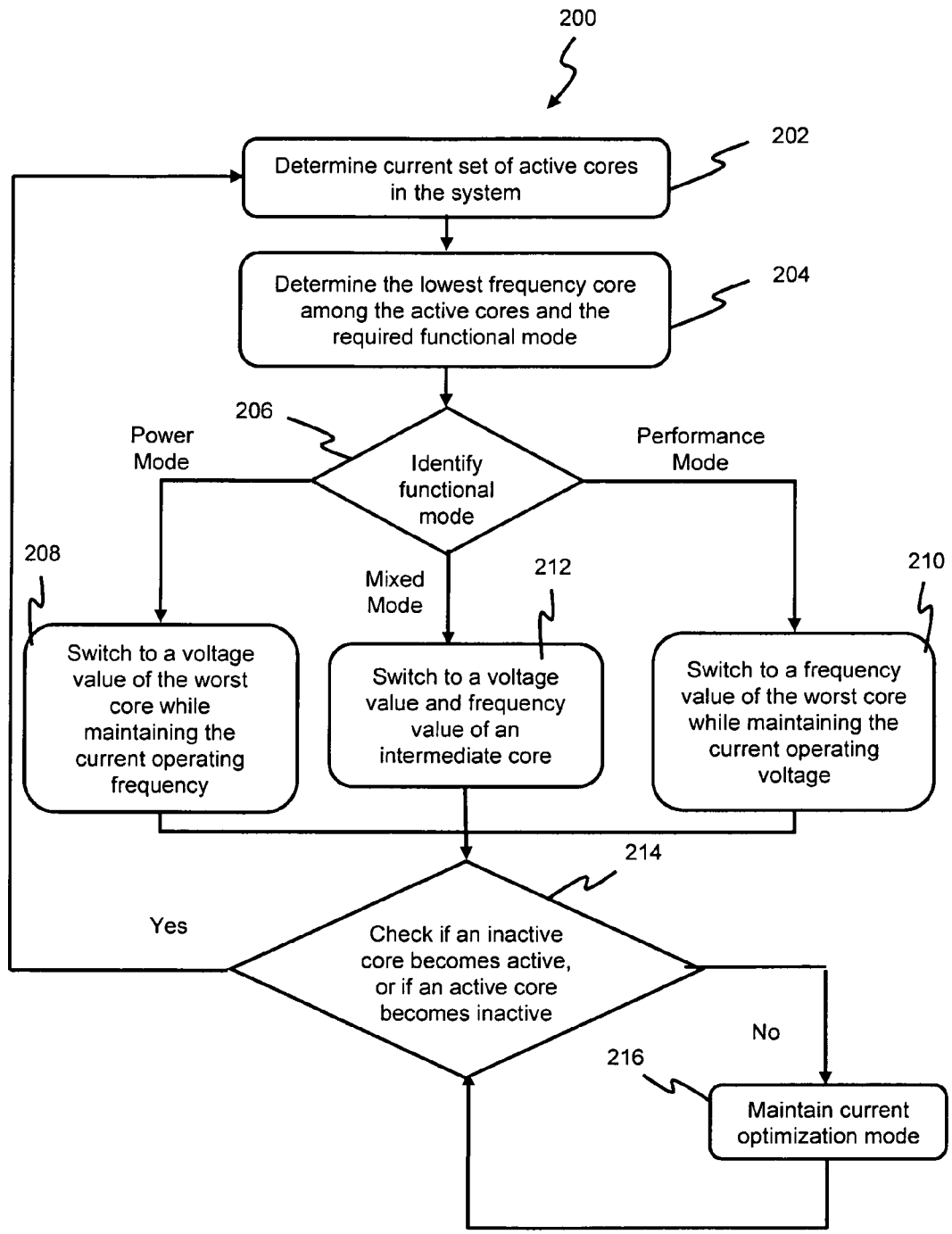
FIG. 2 is a flow diagram illustrating a flow sequence for optimizing the voltage-frequency setup of the multi-core processor system.

FIG. 2 is a flow diagram illustrating a flow sequence 200 for optimizing the voltage-frequency setup of the multi-core processor 102 of FIG. 1. The flow sequence 200 is executed by the multi-core processor 102 during runtime in which active processor cores (e.g. a first plurality of processor cores) are ascertained or identified from among all the processors cores 104A, . . . , 104N (e.g. second plurality of processor cores) provided in the multi-core processor 102 (block 202). The term "active processor cores" herein refers to processor cores that are operatively switched-on. Conversely, "inactive processor cores" refers to processor cores that are operatively switched-off. Further, such "inactive processor cores" may be referred to as entered into a sleep state (C-state) in modern computing terminology. In the sleep state, such as C6, power usage by the processor core is kept to a minimum for power management purposes. Details of the various power management states are described herein below.

From among the active processor cores identified in block 202, a processor core is subsequently identified from the first plurality of processor cores according to predetermined criteria (block 204). In one embodiment, operating frequency of each processor core in the first plurality of processor cores may be ascertained to identify the processor core with lowest operating frequency (i.e. slowest processor speed). In addition, the multi-core processor 102 also ascertains a functional mode required (block 206). The functional mode may be determined by an operating system (e.g. Darwin, LINUX, UNIX, OS-X, WINDOWS or an embedded operating system such as VxWorks) installed on the data processing system 100. The functional mode may be one of the following: power optimization mode, performance optimization mode and mixed mode. The objective of the power optimization mode is to maintain a current performance level while reducing power consumption by the multi-core processor 102. The objective of the performance-optimization mode is to trade power consumption for performance increase, i.e. increase performance level regardless of power consumption. In the mixed mode, both power consumption and performance are of equal importance to the multi-core processor 102.

Figure 3:
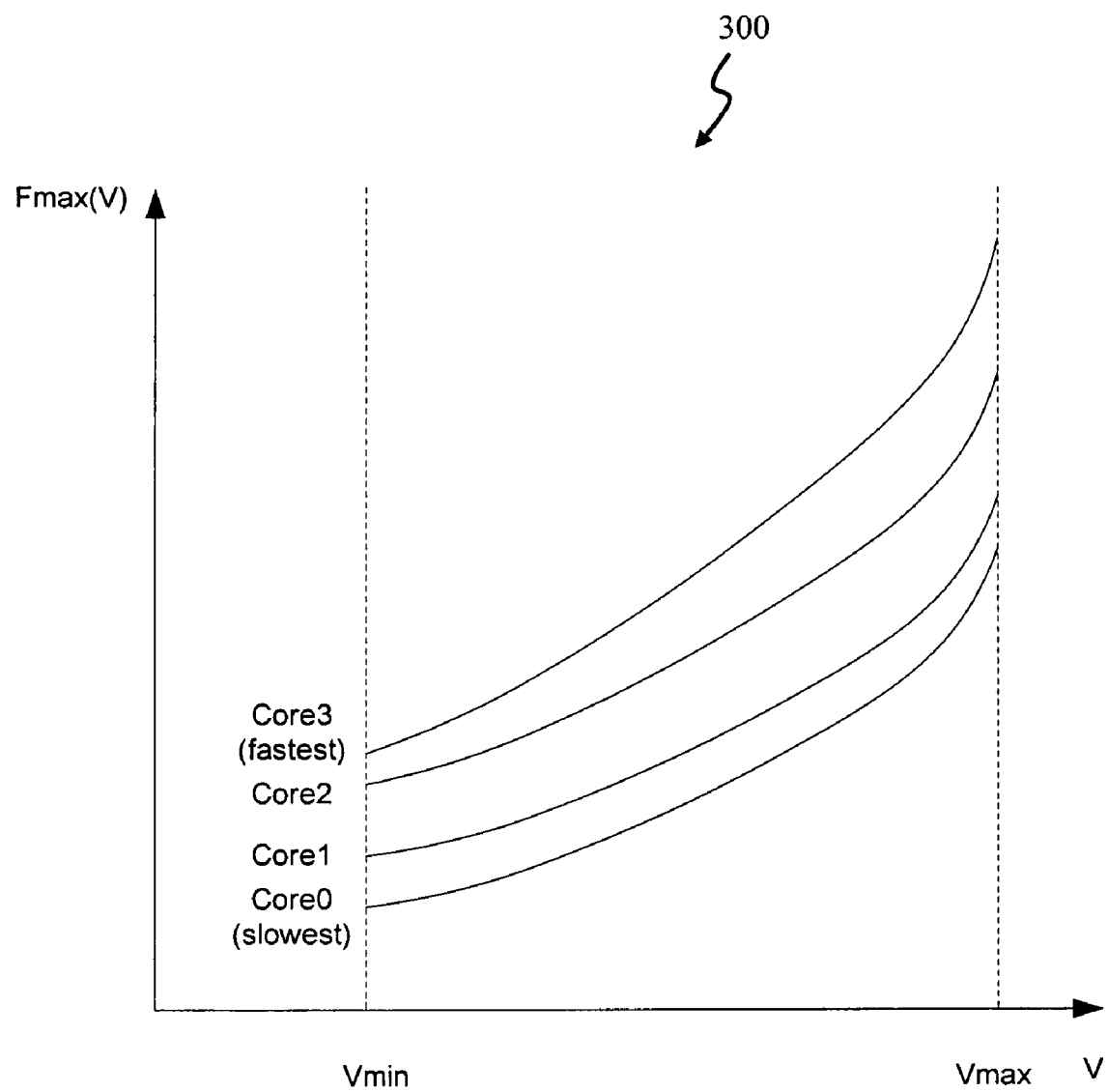
FIG. 3 illustrates exemplary voltage-frequency characteristics curves of processor cores provided in a multi-core processor system.

The flow sequence 200 subsequently proceeds to blocks 208, 210 or 212 according to the identified functional mode to adjust one or more operating parameters, e.g. voltage and frequency. In the power optimization mode (block 208), the multi-core processor 102 is operated according to predetermined voltage-frequency characteristics associated with the processor core identified from the first plurality of processor cores. As illustrated in FIG. 3, the voltage-frequency characteristics of the various processor cores are represented as voltage-frequency characteristic curves ("voltage-frequency curves"). In the power optimization mode, the operating voltage of the multi-core processor 102 may be increased or decreased according to a data point on a voltage-frequency curve corresponding to the identified processor core while maintaining the existing operating frequency. The data point comprises a voltage value and a frequency value.

In the performance optimization mode (block 210), the operating frequency of the multi-core processor 102 may be increased or decreased according to a data point on a voltage-frequency curve corresponding to the identified processor core while maintaining the existing operating voltage.

In the mixed mode (block 212), both the operating frequency and voltage of the multi-core processor 102 may be adjusted according to selected data points on the voltage-frequency curve corresponding to the identified processor core. Additionally, it is to be appreciated that the performance guard-bands of the multi-core processor 102 are not violated under any functional mode in the adjustment of the operating frequency and voltage.

If a change in the state of any processor core is detected, i.e., if an active processor core in the first plurality of processor cores becomes inactive or an inactive processor core in the second plurality of processor cores becomes active (block 214), the flow sequence 200 is re-initiated as described in the foregoing paragraphs. If no change in state of any processor core is ascertained in block 214, the existing functional mode and operating parameters are maintained (block 216). Conversely, when a change is detected under block 214, the flow sequence 200 is restarted from block 202 and executed accordingly based on the foregoing descriptions. Alternatively, the functional mode may also be changed by the operating system, which thereby triggers the restart of the flow sequence 200 at block 202. The sequence may be re-initiated by a functional mode change which is triggered by the operating system.

Reference is made to the "Advanced Configuration and Power Interface (ACPI) Specification, Revision 3.0b, Oct. 10, 2006" which describes various power management states. Each of the processor cores 104A, . . . , 104N may be initiated into various power management states such as C0, C1, C2, et cetera. Such power management states enable modern central processing units (CPUs), such as the multi-core processor 102, to achieve a balance between performance, power consumption and battery life, thermal requirements and noise-level requirements. During CPU idle periods, any one of the processor cores 104A, . . . , 104N may selectively be switched off to enter into a low power state, thereby reducing the overall power consumed by the multi-core processor 102. Before temporarily switching off a processor core, its micro-architecture state is first saved internally and the saved state is restored when the processor core is subsequently reawaken (i.e. switched on). For example, as defined in the "Deep Power-Down Technology" schema by Intel Corp. of Santa Clara, Calif., the C4 state effectively switches off the core clock and phase-locked loop (PLL) of the processor core while the L1 caches 112, 114 are flushed and the L2 cache 116 is partially flushed. In contrast, in the C6 state, both the core clock and PLL of the processor core are switched off while the L1 and L2 112, 114, 116 caches are flushed. Particularly, the multi-core processor 102 may consume as little as 100 milliwatts (mW) of power in the C6 state.

The ACPI also manages the CPU core frequencies in form of P-state requests. Each above-reference ACPI specification P-state setting is a request made by the operating system to the CPU. P-states are calculated by the operating system based on the computation required to be performed by the CPU. In high P-states, the OS requires higher performance level. This state may be referred to as "Turbo" mode of Intel® Dynamic Acceleration Technology. In such high P-states, the CPU can provide higher operating frequency than requested by the OS in order to provide a higher performance level. If the CPU is operating in the "Turbo mode" while optimizing performance (block 210), the operating frequency may be higher than the frequency value predetermined by the corresponding voltage-frequency curve.

FIG. 3 illustrates exemplary voltage-frequency curves of the processor cores 104A, . . . , 104N provided in the multi-core processor 102. As shown in FIG. 3, voltage is represented on the x-axis and maximal frequency, corresponding to each voltage value, is represented on the y-axis. Each of the voltage-frequency curves corresponds to the equivalent measured voltage-frequency characteristics of the associated processor core. The voltage-frequency curves may be determined during the manufacturing stage of the multi-core processor 102. Further, FIG. 3 illustrates that the voltage-frequency curves are sorted according to the operating frequencies of the processor cores 104A, . . . , 104N, i.e. in the order from the slowest frequency (i.e. the bottom curve) to the fastest frequency (i.e. the top curve). Separately, according to FIG. 2, whenever a processor core enters the C6 state, the corresponding voltage-frequency curve is then excluded in the execution of the flow sequence 200 by the multi-core processor 102 as block 202 of the flow sequence 200 requires the determination of a plurality of active processor cores.

Figure 4:
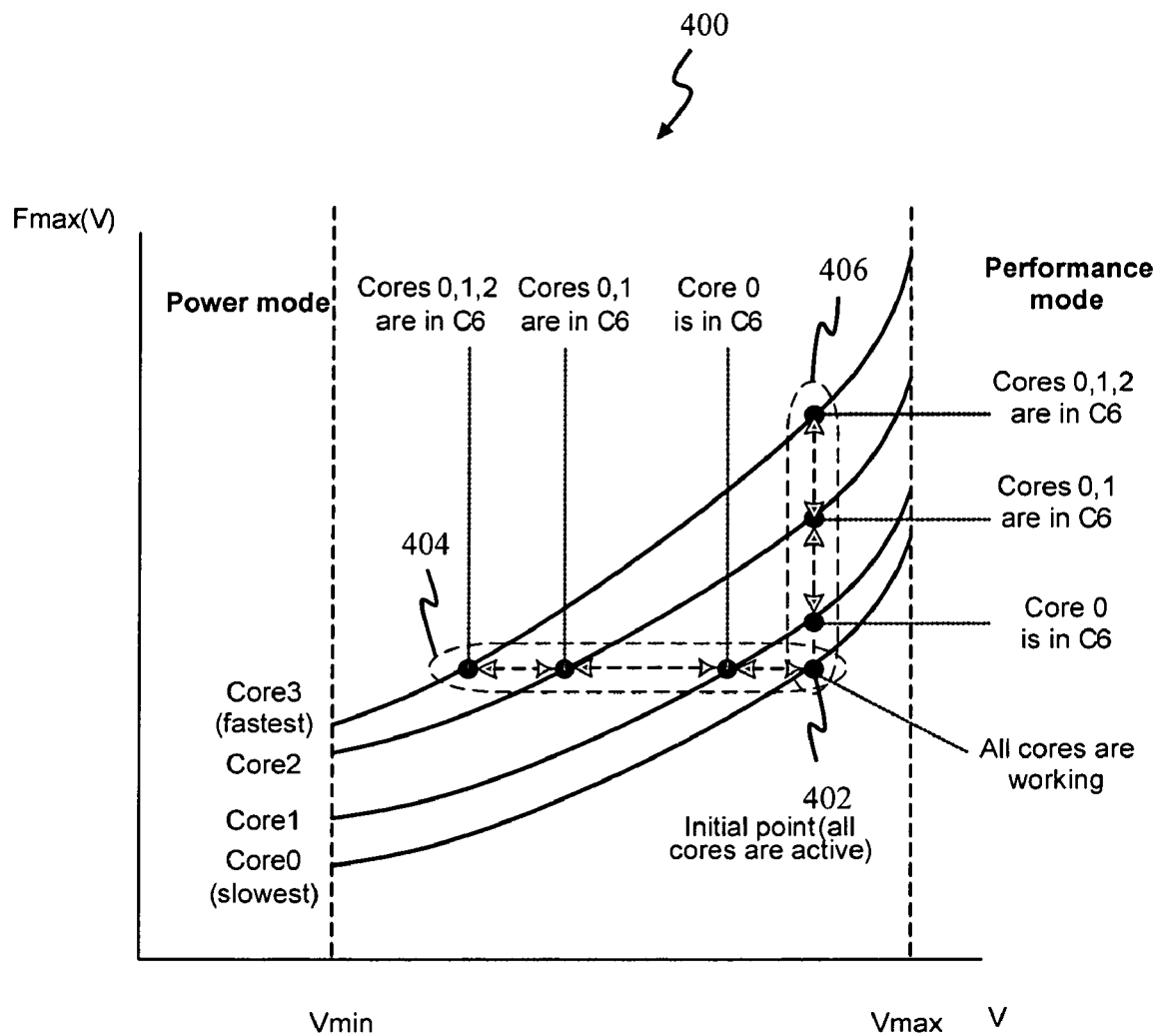
FIG. 4 illustrates possible ways of switching between power and performance optimization modes in a multi-core processor system through use of the voltage-frequency characteristics curves of FIG. 3.

FIG. 4 illustrates possible ways the multi-core processor 102 may switch between the various functional modes in reference with the flow sequence 200 of FIG. 2. During runtime, whenever a processor core enters or leaves the C6 state, the first plurality of processor cores changes and a processor core with the slowest processor speed is then ascertained or identified from among a re-ascertained first plurality of processor core. The voltage-frequency curve associated with the slowest processor core is then selected. Depending on the functional mode required, at least one of the voltage and frequency is then adjusted accordingly. For the purpose of the description herein, the slowest processor core among the first plurality of processor cores in the previous stage may be represented as "i" and a new processor core, now part of the first plurality of processor cores, may be represented as "j". Based on the voltage-frequency characteristics curve of the slowest processor core, the operating voltage and frequency are adjusted according to one of the following rules below as described in pseudo-code form:

(1) IF "i" = "j", DO NOTHING;
(2) IF "i" < "j", CHECK FUNCTIONAL MODE;
    IF FUNCTIONAL MODE = "power optimization",
        DECREASE VOLTAGE;
    ELSE IF FUNCTIONAL MODE = "performance optimization",
        INCREASE FREQUENCY;
    ELSE
        ADJUST BOTH VOLTAGE AND FREQUENCY;
(3) IF "i" > "j", CHECK FUNCTIONAL MODE;
    IF FUNCTIONAL MODE = "power optimization",
        INCREASE VOLTAGE;
    ELSE IF FUNCTIONAL MODE = "performance optimization",
        DECREASE FREQUENCY;
    ELSE
        ADJUST BOTH VOLTAGE AND FREQUENCY;

Specifically, rule (1) pertains to a situation in which no processor core enters/leaves the C6 state whereas rules (2) and (3) pertain to situations in which a slower processor core enters and leaves the C6 state respectively. For example, as shown in FIG. 4, the multi-core processor 102 is initially operated at the data point 402 where all processor cores are operatively switched-on. Subsequently, depending on the functional mode required and the particular processor cores that enter/leave the C6 state, the multi-core processor 102 may be operated at other data points of the different voltage-frequency curves. In the power optimization mode, the operating point may traverse between data points 402, 404 of the voltage-frequency curves to adjust the operating voltage while keeping operating frequency constant. In the performance optimization mode, the operating point may traverse between data points 402, 406 of voltage-frequency curves to adjust operating frequency while keeping operating voltage constant.

Embodiments of the invention may be realized as computer readable code (i.e. programming instructions) on a computer readable storage medium. The computer readable storage medium is any data storage device that can store data which can thereafter be read by a computer system, including both transfer and non-transfer devices. Examples of the computer readable storage medium include read-only memory, random-access memory, CD-ROMs, Flash memory cards, DVDs, magnetic tape, optical data storage devices, and carrier waves. The computer readable storage medium can also be distributed over network-coupled computer systems so that the computer readable code is stored and executed in a distributed fashion.

Other embodiments will be apparent to those skilled in the art from consideration of the specification and practice of the present invention. Furthermore, certain terminology has been used for the purposes of descriptive clarity, and not to limit the invention. The embodiments and features described above should be considered exemplary, with the invention being defined by the appended claims.

The invention claimed is:

1. A method comprising:
   ascertaining a first plurality of processor cores from a second plurality of processor cores provided in a multi-core processor, the first plurality of processor cores being operatively switched on, wherein each processor core within the multi-core includes a frequency/voltage controller;
   identifying a processor core having a lowest operating frequency from among the first plurality of processor cores; and
   based on a predefined functional mode, adjusting at least one operational parameter according to predetermined voltage-frequency characteristics corresponding to the identified processor core with its frequency/voltage controller.

2. The method according to claim 1, wherein ascertaining the first plurality of processor cores is performed upon detecting a state change in any of the first and the second plurality of processor cores.

3. The method according to claim 1, wherein the first plurality of processor cores is ascertained when at least one of the first plurality of processor cores becomes operatively switched-off.

4. The method according to claim 1, wherein the first plurality of processor cores is ascertained when at least one of the second plurality of processor cores becomes operatively switched-on.

5. The method according to claim 1, wherein the predefined functional mode is one of a power optimization mode and a performance optimization mode.

6. The method according to claim 5, wherein adjusting at least one operational parameter includes adjusting only an operating voltage in a power optimization mode.

7. The method according to claim 5, wherein adjusting at least one operational parameter includes adjusting only an operating frequency in a performance optimization mode.

8. The method according to claim 1, wherein adjusting at least one operational parameter includes adjusting an operating voltage and an operating frequency in a mixed mode.

9. The method according to claim 1, wherein adjusting at least one operational parameter includes operating at a frequency higher than the adjusted operational parameter.

10. A non-transitory computer-readable storage medium having computer-executable instructions, comprising:
    ascertaining a first plurality of processor cores from a second plurality of processor cores provided in a multi-core processor, the first plurality of processor cores being operatively switched on, wherein each processor core within the multi-core includes a frequency/voltage controller;
    identifying a processor core having a lowest operating frequency from among the first plurality of processor cores; and
    based on a predefined functional mode, adjusting at least one operational parameter according to predetermined voltage-frequency characteristics corresponding to the identified processor core with its frequency/voltage controller.

11. The non-transitory computer-readable storage medium according to claim 10, wherein the first plurality of processor cores is ascertained when at least one of the first plurality of processor cores becomes operatively switched off.

12. The non-transitory computer-readable storage medium according to claim 10, wherein the first plurality of processor cores is ascertained when at least one of the second plurality of processor cores becomes operatively switched on.

13. The non-transitory computer-readable storage medium according to claim 10, wherein adjusting at least one operational parameter includes adjusting only an operating voltage in a power optimization mode.

14. The non-transitory computer-readable storage medium according to claim 10, wherein adjusting at least one operational parameter includes adjusting only an operating frequency in a performance optimization mode.

15. The non-transitory computer-readable storage medium according to claim 10, wherein adjusting at least one operational parameter includes operating at a frequency higher than the adjusted operational parameter.

* * * * *